US011858730B1

(12) United States Patent
Stringer

(10) Patent No.: US 11,858,730 B1
(45) Date of Patent: Jan. 2, 2024

(54) FEMININE HYGIENE DISPOSAL CONTAINER

(71) Applicant: Lora Stringer, Reynoldsburg, OH (US)

(72) Inventor: Lora Stringer, Reynoldsburg, OH (US)

( * ) Notice: Subject to any disclaimer, the term of this patent is extended or adjusted under 35 U.S.C. 154(b) by 59 days.

(21) Appl. No.: 17/714,192

(22) Filed: Apr. 6, 2022

(51) Int. Cl.
*B65F 1/06* (2006.01)

(52) U.S. Cl.
CPC .............. *B65F 1/062* (2013.01); *B65F 1/067* (2013.01); *B65F 2210/1675* (2013.01); *B65F 2240/164* (2013.01)

(58) Field of Classification Search
CPC ...... B65F 1/062; B65F 1/1426; B65F 1/1421; B65F 1/16; B65F 2240/132; B65F 2240/164; B65F 2210/1675; B65F 2210/167; B65F 2210/168; B65F 2210/184
See application file for complete search history.

(56) References Cited

U.S. PATENT DOCUMENTS 6,128,890 A 10/2000 Firth
8,266,871 B1 * 9/2012 Stravitz .................... B65F 1/16 53/567
9,580,242 B2 2/2017 Van Veen
9,718,614 B2 * 8/2017 Chomik .................... B65B 9/15
D799,136 S 10/2017 Cudworth
9,957,105 B2 5/2018 Germanow
10,086,996 B2 * 10/2018 Dunn ...................... B65F 1/062
2014/0121090 A1 * 5/2014 Lin ........................ B65F 1/062 493/189

FOREIGN PATENT DOCUMENTS

WO 9939995 8/1999

* cited by examiner

*Primary Examiner* — Javier A Pagan
(74) *Attorney, Agent, or Firm* — Kyle A. Fletcher, Esq.

(57) ABSTRACT

The feminine hygiene disposal container is a containment structure. The feminine hygiene disposal container is configured for use with a feminine hygiene product. The feminine hygiene disposal container forms a protected space that contains the feminine hygiene product after use. The feminine hygiene disposal container receives the feminine hygiene product. The feminine hygiene disposal container secures the feminine hygiene product in the protection space. The feminine hygiene disposal container comprises a housing structure, a control structure, and one or more bag cartridges. The housing structure contains the control structure and the one or more bag cartridges. The control structure controls the operation of the feminine hygiene disposal container. By controlling the operation of the feminine hygiene disposal container is meant that the control structure: a) detects the deposit of a feminine hygiene product; and, b) secures the feminine hygiene product in the protection space.

12 Claims, 5 Drawing Sheets

FEMININE HYGIENE DISPOSAL CONTAINER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of refuse receptacles with removable inserts. (B65F1/04)

SUMMARY OF INVENTION

The feminine hygiene disposal container is a containment structure. The feminine hygiene disposal container is configured for use with a feminine hygiene product. The feminine hygiene disposal container forms a protected space that contains the feminine hygiene product after use. The feminine hygiene disposal container receives the feminine hygiene product. The feminine hygiene disposal container secures the feminine hygiene product in the protection space. The feminine hygiene disposal container comprises a housing structure, a control structure, and one or more bag cartridges. The housing structure contains the control structure and the one or more bag cartridges. The control structure controls the operation of the feminine hygiene disposal container. By controlling the operation of the feminine hygiene disposal container is meant that the control structure: a) detects the deposit of a feminine hygiene product; and, b) secures the feminine hygiene product in the protection space.

These together with additional objects, features and advantages of the feminine hygiene disposal container will be readily apparent to those of ordinary skill in the art upon reading the following detailed description of the presently preferred, but nonetheless illustrative, embodiments when taken in conjunction with the accompanying drawings.

In this respect, before explaining the current embodiments of the feminine hygiene disposal container in detail, it is to be understood that the feminine hygiene disposal container is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the feminine hygiene disposal container.

It is therefore important that the claims be regarded as including such equivalent construction insofar as they do not depart from the spirit and scope of the feminine hygiene disposal container. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
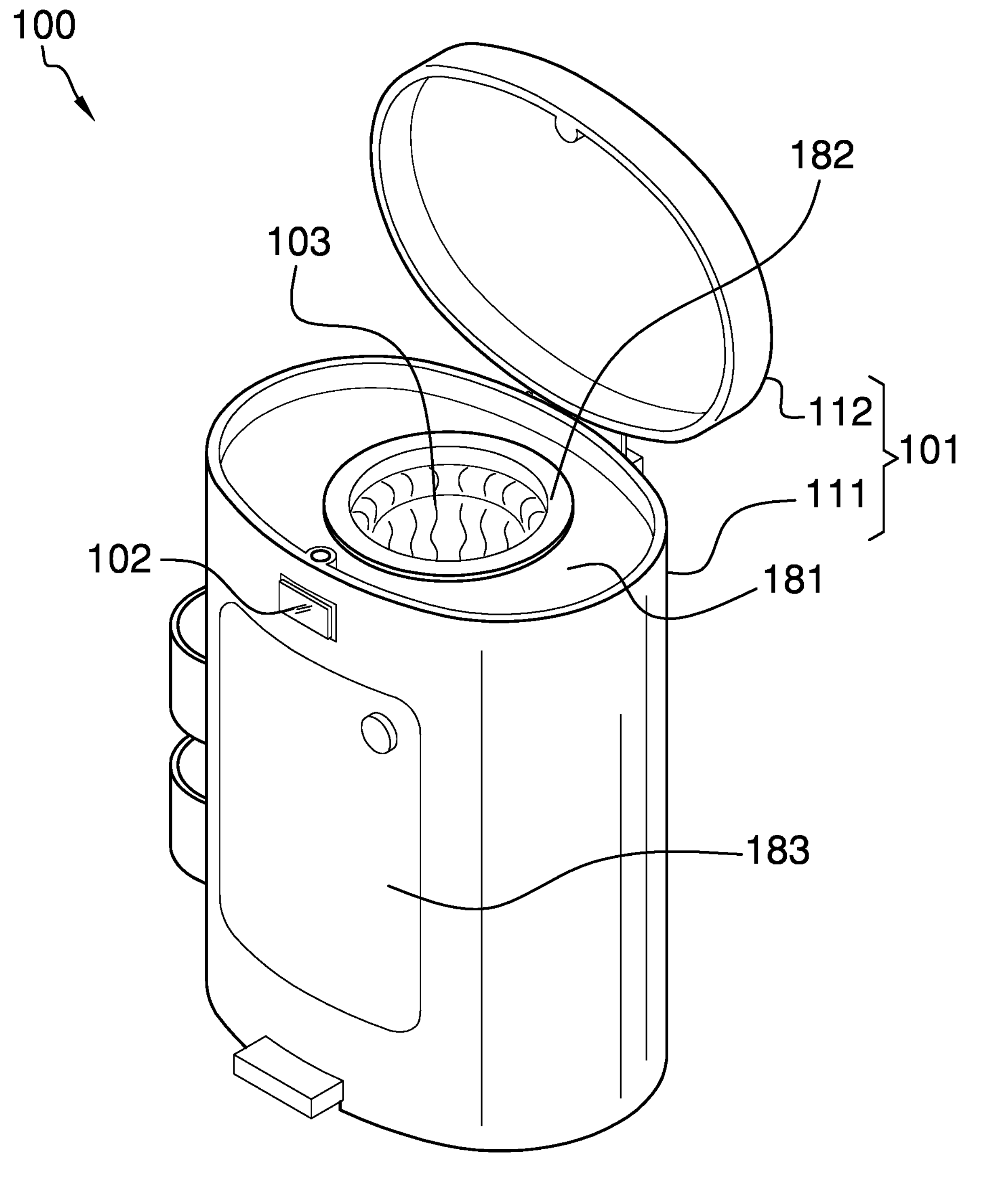
FIG. 1 is a perspective view of an embodiment of the disclosure.
Figure 2:
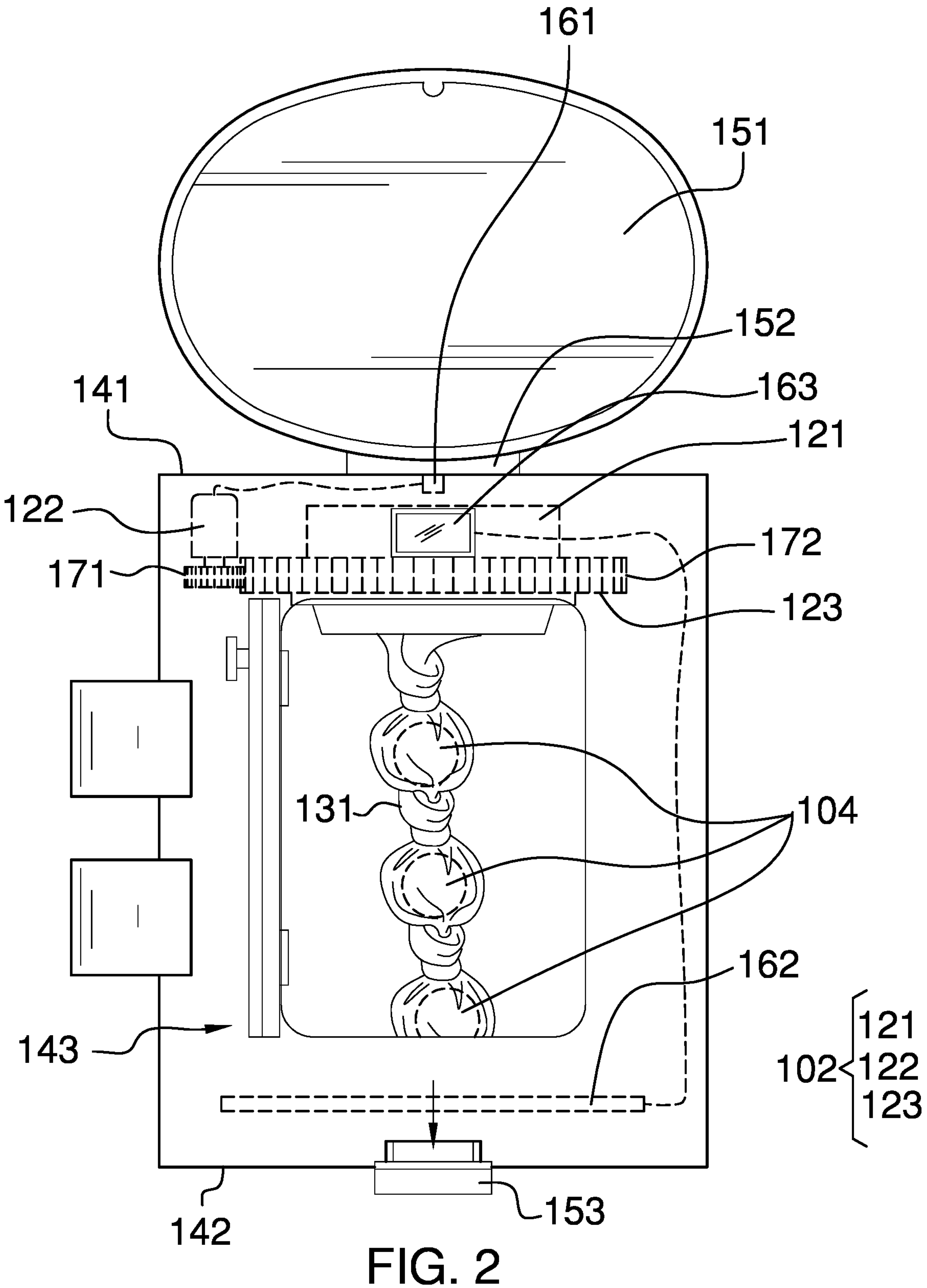
FIG. 2 is a front view of an embodiment of the disclosure.
Figure 3:
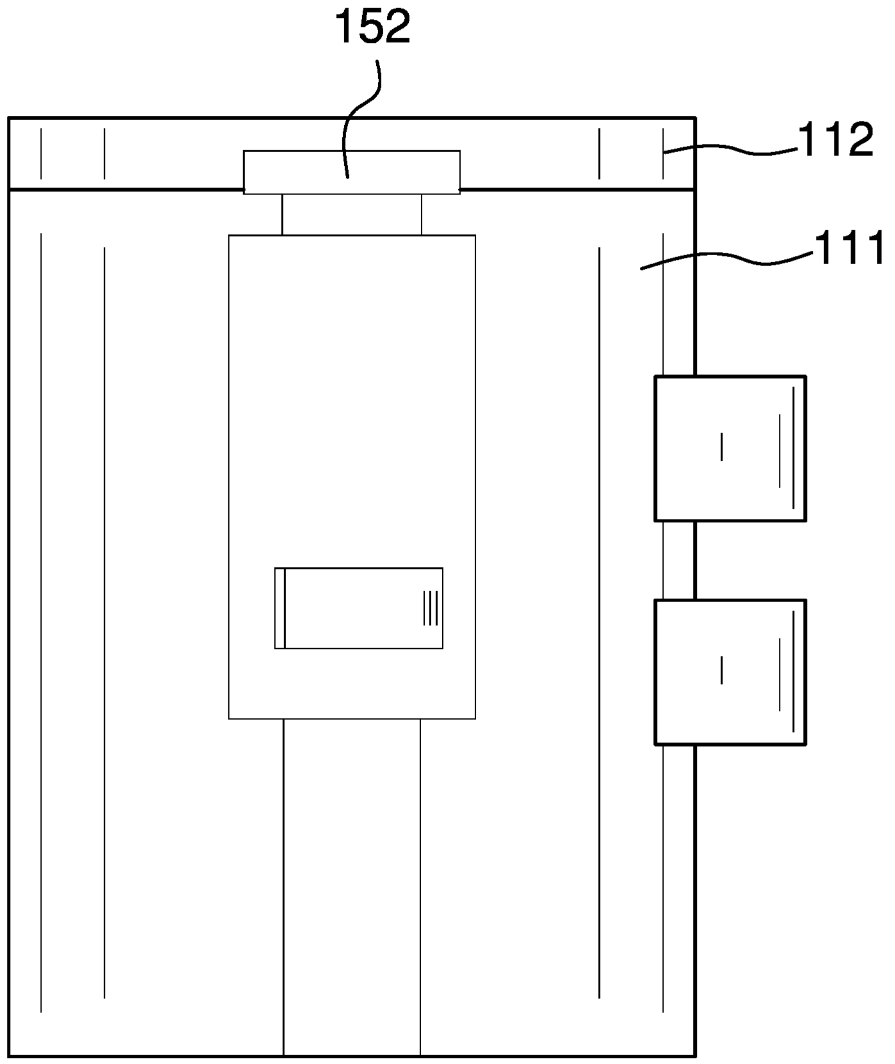
FIG. 3 is a rear view of an embodiment of the disclosure.
Figure 4:
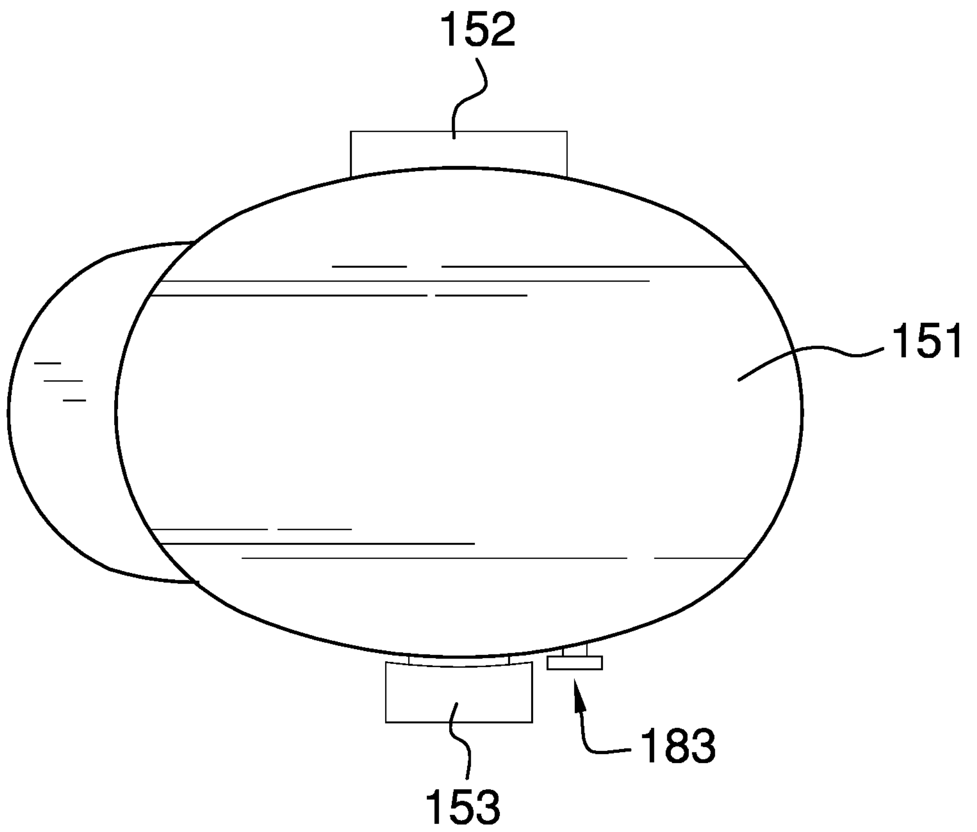
FIG. 4 is a top view of an embodiment of the disclosure.
Figure 5:
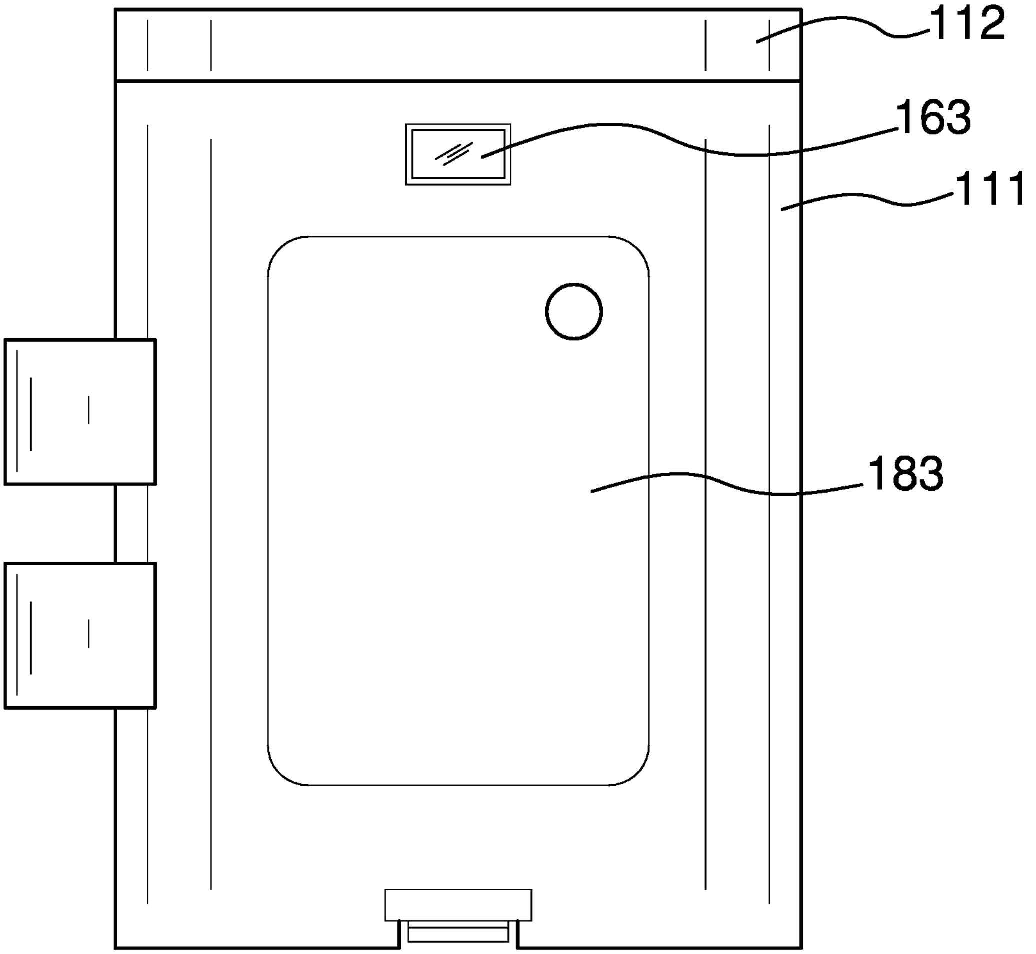
FIG. 5 is a front view of an embodiment of the disclosure.

Detailed reference will now be made to one or more potential embodiments of the disclosure, which are illustrated in FIGS. 1 through 5.

The feminine hygiene disposal container 100 (hereinafter invention) is a containment structure. The invention 100 is configured for use with a feminine hygiene product 104. The invention 100 forms a protected space that contains the feminine hygiene product 104 after use. The invention 100 receives the feminine hygiene product 104. The invention 100 secures the feminine hygiene product 104 in the protection space. The invention 100 comprises a housing structure 101, a control structure 102, and one or more bag cartridges 103. The housing structure 101 contains the control structure 102 and the one or more bag cartridges 103. The control structure 102 controls the operation of the invention 100. By controlling the operation of the invention 100 is meant that the control structure 102: a) detects the deposit of a feminine hygiene product 104; and, b) secures the feminine hygiene product 104 in the protection space.

The feminine hygiene product 104 inserts into the individual bag cartridge 131 such that the deposited feminine hygiene product 104 aligns over the center of the OFI aperture 182. After the deposit of the feminine hygiene product 104, the control structure 102 draws the closed end of the individual bag cartridge 131 into the hollow interior of the housing structure 101. The control structure 102 then twists the individual bag cartridge 131 around a vertically oriented axis of rotation such that the lateral face of the individual bag cartridge 131 closes in on itself. The control structure 102 continues the twisting process until the lateral face of the individual bag cartridge 131 forms a fluid impermeable enclosure that forms the segregated protection space that encloses the feminine hygiene product 104.

Each individual bag cartridge 131 selected from the one or more bag cartridges 103 is a trash bag. Each selected individual bag cartridge 131 forms the segregated protection space that encloses each feminine hygiene product 104 deposited into the housing structure 101. Each selected individual bag cartridge 131 forms a segregated protection space for each feminine hygiene product 104 deposited into the housing structure 101. The segregated protection space formed by the selected individual bag cartridge 131 around each deposited feminine hygiene product 104 forms a fluid impermeable barrier around the deposited feminine hygiene product 104. The individual bag cartridge 131 is a rolled structure. The lateral face of the trash bag structure is rolled in a direction from the open end of the individual bag cartridge 131 towards the closed end of the individual bag cartridge 131. The individual bag cartridge 131 is rolled to form a disk like structure. The rolled individual bag cartridge 131 is positioned over the OFI aperture 182 of the OF insert 181 mounted in the open face 141 of the pan structure 111.

The housing structure 101 forms the containment structure of the invention 100. The housing structure 101 is a hollow structure. The housing structure 101 is a rigid structure. The housing structure 101 forms the containment space used to hold the feminine hygiene products 104. The housing structure 101 contains the control structure 102 and the one or more bag cartridges 103. The housing structure 101 is formed with the apertures and form factors necessary to allow for the operation of the invention 100. The housing structure 101 comprises a pan structure 111 and a lid structure 112.

The pan structure 111 is a prism structure. The pan structure 111 is formed as a semi-enclosed prism structure. The pan structure 111 has a pan shape. The pan structure 111 is a hollow structure. The pan structure 111 forms the physical containment space of the housing structure 101. The pan structure 111 further comprises an open face 141, a closed face 142, and a lateral face structure 143.

The open face 141 is a horizontally oriented structure. The open face 141 is a congruent end of the prism structure of the pan structure 111. The open face 141 is the open face 141 of the pan shape of the pan structure 111. The open face 141 forms the superior boundary of the pan structure 111. The feminine hygiene product 104 is placed into the hollow interior of the pan structure 111 through the open face 141. The open face 141 further comprises an OF insert 181.

The OF insert 181 is a disk shaped structure. The OF insert 181 is geometrically similar to the open face 141 of the pan structure 111. The OF insert 181 inserts into the open face 141 of the pan structure 111 with a tight fit. The OF insert 181 forms a fluid impermeable seal between the lateral face of the disk structure of the open face 141 and the interior surfaces of the lateral face structure 143 of the pan structure 111. The OF insert 181 partially encloses the hollow interior of the pan structure 111 when the lid structure 112 rotates into the open position The OF insert 181 further comprises an OFI aperture 182. The OFI aperture 182 is an aperture that is formed through the faces of the disk structure of the OF insert 181. The OFI aperture 182 forms an opening that receives the feminine hygiene product 104 into the individual bag cartridge 131 that encloses the OFI aperture 182. The feminine hygiene product 104 is drawn into the hollow interior of the pan structure 111 that is inferior to the feminine hygiene product 104 as part of the process of twisting the individual bag cartridge 131 to form the segregated protection space around the feminine hygiene product 104.

The closed face 142 is a horizontally oriented structure. The closed face 142 is a congruent end of the prism structure of the pan structure 111. The closed face 142 is the closed face 142 of the pan shape of the pan structure 111. The closed face 142 forms the inferior boundary of the pan structure 111. The closed face 142 is the congruent end of the pan structure 111 that is distal from the open face 141.

The lateral face structure 143 forms the lateral faces of the pan shape of the pan structure 111. The lateral face structure 143 forms the vertically oriented containment boundaries of the pan structure 111. The lateral face structure 143 further comprises an LF door 183. The LF door 183 is a door that forms the semi-enclosed prism structure of the pan structure 111. The LF door 183 provides access into the hollow interior of the pan structure 111 that is below the OF insert 181. The LF door 183 allows for the removal of the feminine hygiene products 104 from the pan structure 111 while each feminine hygiene product 104 remains contained within the segregated protection space.

The lid structure 112 is a disk shaped structure. The lid structure 112 is geometrically similar to the open face 141 of the pan structure 111. The lid structure 112 attaches to the pan structure 111 such that the lid structure 112 rotates relative to the pan structure 111. The lid structure 112 rotates between an open position and a closed position. The lid structure 112 attaches to the pan structure 111 such that the lid structure 112 encloses the open face 141 of the pan structure 111 when the lid structure 112 is in the closed position. The lid structure 112 forms a fluid impermeable seal with the open face 141 when the lid structure 112 is in the closed position.

The control structure 102 monitors the position of the lid structure 112. The control structure 102 initiates twisting the individual bag cartridge 131 to enclose the feminine hygiene product 104 in its segregated protection space every time the lid structure 112 rotates into the closed position The lid structure 112 further comprises an enclosing structure 151, a hinge 152, and a pedal 153.

The enclosing structure 151 is a disk shaped structure. The enclosing structure 151 is geometrically similar to the open face 141 of the pan structure 111. The enclosing structure 151 is sized such that the enclosing structure 151 encloses the open face 141 when the lid structure 112 rotates into the closed position.

The hinge 152 is a fastening structure. The hinge 152 is a rotating structure. The hinge 152 attaches the enclosing structure 151 to the open face 141 of the pan structure 111 such that the enclosing structure 151 rotates between the open position and the closed position The pedal 153 is a foot operated structure. The pedal 153 forms a mechanical linkage with the enclosing structure 151. The pedal 153 transfers the motive forces generated by a foot into the rotational forces required to rotate the lid structure 112 relative to the pan structure 111.

The control structure 102 is an electromechanical device. The control structure 102 detects the deposit of a feminine hygiene product 104 into the invention 100. The control structure 102 secures each deposited feminine hygiene product 104 into a segregated protection space. By segregated protection space is meant that the protection space that encloses any initially selected feminine hygiene product 104 deposited into the housing structure 101 is segregated from the protection space that encloses any subsequent feminine hygiene product 104 that is deposited into the housing structure 101.

The control structure 102 further determines the mass of the feminine hygiene products 104 that are contained within the housing structure 101. The control structure 102 generates a visible indication that the housing structure 101 is full when the mass of the feminine hygiene products 104 exceeds a previously determined mass.

The control structure 102 comprises a logic circuit 121, an electric motor 122, and a rotating ring 123. The logic circuit 121, the electric motor 122, and the rotating ring 123 are electrically interconnected.

The logic circuit 121 is an electric circuit. The logic circuit 121 controls the operation of the control structure 102. The electric motor 122 electrically connects to the logic circuit 121. The logic circuit 121 controls the operation of the electric motor 122. The logic circuit 121 monitors the weight of the feminine hygiene products 104 contained in the pan structure 111 of the housing structure 101. The logic circuit 121 generates a visible indication that the pan structure 111 is full when the mass of the feminine hygiene products 104 exceeds the previously determined mass. The logic circuit 121 monitors the position of the lid structure 112. The logic circuit 121 initiates the twisting of the individual bag cartridge 131 when the detects a change in status of the lid structure 112 from the open position into the closed position. The logic circuit 121 further comprises a lid sensor 161, a weight sensor 162, and an indication LED 163.

The lid sensor 161 is an electric structure. The lid sensor 161 mounts on the open face 141 of the pan structure 111. The lid sensor 161 electrically connects to the logic circuit 121. The logic circuit 121 monitors the lid sensor 161. The logic circuit 121 uses the lid sensor 161 to determine when the lid structure 112 has rotated into the closed position.

The weight sensor 162 is an electric structure. The weight sensor 162 mounts in the hollow interior of the pan structure 111. The weight sensor 162 electrically connects to the logic circuit 121. The logic circuit 121 monitors the weight sensor 162. The logic circuit 121 uses the weight sensor 162 to determine when the weight of the feminine hygiene products 104 contained in the pan structure 111 exceeds the predetermined weight threshold.

The indication LED 163 is an LED. The indication LED 163 mounts on the exterior surface of the lateral face structure 143 of the pan structure 111. The indication LED 163 electrically connects to the logic circuit 121. The logic circuit 121 monitors the indication LED 163. The logic circuit 121 illuminates the indication LED 163 when the weight of the feminine hygiene products 104 contained in the pan structure 111 exceeds the predetermined weight threshold.

The electric motor 122 is an electrical device. The electric motor 122 converts electric energy into rotational energy. The logic circuit 121 provides the electric motor 122 with the electric energy necessary for operation. The electric motor 122 forms a mechanical linkage with the rotating ring 123 such that the rotation of the electric motor 122 rotates the rotating ring 123 relative to the OFI aperture 182 of the OF insert 181.

The electric motor 122 comprises an EM gear 171. The EM gear 171 is a gear. The EM gear 171 mounts on the electric motor 122 such that the rotation of the electric motor 122 rotates the EM gear 171.

The rotating ring 123 is a ring shaped structure. The rotating ring 123 mounts on the inferior surface of the OF insert 181 such that the rotating ring 123 rotates relative to the OFI aperture 182. The position of the rotating ring 123 on the OF insert 181 is such that the center axis of the characteristic negative space formed through the ring shape of the rotating ring 123 aligns with the center axis of the OFI aperture 182. The inner perimeter of the rotating ring 123 forms a physical connection with the lateral face of the individual bag cartridge 131.

The rotating ring 123 comprises a RR gear structure 172. The RR gear structure 172 is a gear. The teeth of the RR gear structure 172 mount on the outer perimeter of the disk structure of the rotating ring 123. The teeth of the EM gear 171 mesh with the teeth of the RR gear structure 172 such that the rotation of the EM gear 171 rotates the RR gear structure 172. The rotation of the RR gear structure 172 subsequently rotates the rotating ring 123.

The outer perimeter of the rotating ring 123 forms a physical connection with the EM gear 171 of the electric motor 122. The rotation of the EM gear 171 rotates the rotating ring 123. The rotation of the rotating ring 123 rotates the lateral face of the individual bag cartridge 131 such that the rotating ring 123 rotates the lateral face of the individual bag cartridge 131 onto itself to form the fluid impermeable closure that creates the segregated protection space that encloses the feminine hygiene product 104.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Aperture: As used in this disclosure, an aperture is a prism-shaped negative space that is formed completely through a structure or the surface of a hollow structure.

Bag: As used in this disclosure, a bag is a container made of a flexible material. The bag has a single opening which allows the bag to receive the items to be contained.

Barrier: As used in this disclosure, a barrier is a physical obstacle that forms a boundary between a first space and a second space. The barrier prevents the passage of an object between the first space and the second space.

Boundary Structure: As used in this disclosure, a boundary structure is a barrier that separates a first object from a second object such that the second object cannot damage the first object.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned.

When the center axes of two cylinder, prism or pyramidal structures do not share the same line they are said to be offset.

Closed Position: As used in this disclosure, a closed position refers to a movable barrier structure that is in an orientation that prevents passage through a port or an aperture. The closed position is often referred to as an object being "closed." Always use orientation.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space (or protection space) used to store and transport an object. The term containment structure is a synonym for container.

Copolymer: As used in this disclosure, a copolymer is a polymer formed from two or more repeating molecules (also referred to as monomers).

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Door: As used in this disclosure, a door is a movable or removable barrier that is attached to the wall of a room or the surface of a container for the purpose of allowing or preventing access through an aperture into the room or container.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Energy: As used in this disclosure, the energy is a term used in physics. Energy refers to the ability of a system to do work. Energy is a conserved property of a system. Energy is a quantifiable and is generally expressed in units of Joules.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Exterior: As used in this disclosure, the exterior is used as a relational term that implies that an object is not contained within the boundary of a structure or a space.

Feminine Hygiene Product: As used in this disclosure, a feminine hygiene product therapeutic device that is intended for use with the reproductive organs of a woman.

Fitted: As used in this disclosure, the term fitted refers to two geometrically similar structures wherein the smaller geometrically similar structure inserts into the larger geometrically similar structure with a tight fit.

Flexible: As used in this disclosure, flexible refers to an object or material that will deform when a force is applied to it but that will not necessarily return to its original shape when the deforming force is removed.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Force Sensor: As used in this disclosure, the force sensor is a sensor that generates an electrically measurable signal that is a function of the amount of force applied to the force sensor. The force sensor is often referred to as a pressure sensor. The force sensor commonly measures force using the piezoelectric effect generated by the deformation of a material. A pressure sensor is a force sensor calibrated to measure force per unit area.

Force: As used in this disclosure, a force refers to a net (or unopposed) measurable interaction that changes the direction of motion of an object, the velocity of motion of an object, the momentum of an object, or the stress within an object. The term work refers to a measure of the amount of energy that is transferred through the application of a force over a distance. The term power refers to a measure of the amount of energy that is transferred over a period of time.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Gas: As used in this disclosure, a gas refers to a state (phase) of matter that is fluid and that fills the volume of the structure that contains it. Stated differently, the volume of a gas always equals the volume of its container.

Gear: As used in this disclosure, a gear is a toothed wheel, cylinder, or other toothed mechanical element that is used to transmit motion, a change of speed, or a change of direction to second toothed wheel, cylinder, or other toothed mechanical element.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Inner Perimeter and Outer Perimeter: As used in this disclosure, the inner perimeter and the outer perimeter refer to two geometrically similar structures of a curved object. The inner perimeter refers to the geometrically similar structure with the shorter span of length. The outer perimeter refers to the geometrically similar structure with the greater span of length.

Interior: As used in this disclosure, the interior is used as a relational term that implies that an object is contained within the boundary of a structure or a space.

LED: As used in this disclosure, an LED is an acronym for a light emitting diode. A light emitting diode is a diode that is also a light source.

Lid: As used in this disclosure, a lid is a removable cover that is placed over an opening of a hollow structure to enclose the hollow structure.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Cell: As used in this disclosure, a load cell is a transducer that measures an applied force and generates an electrical signal that is a known function of the applied force. A load cell is often used to measure weight.

Load Path: As used in this disclosure, a load path refers to a chain of one or more structures that transfers a load generated by a raised structure or object to a foundation, supporting surface, or the earth.

Logic Circuit: As used in this disclosure, a logic circuit is non-programmable electrical device that receives one or more digital or analog inputs and uses those digital or analog inputs to generate one or more digital or analog outputs. This disclosure assumes that the logic circuit is not a programmable device.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Mass: As used in this disclosure, refers to a quantity of matter within a structure. Mass is measured and quantified by the reaction of the structure to a force. Mass can also be roughly quantified as a function of atomic composition and the number of atoms contained within the structure. The term weight refers to the quantification of a mass that is exposed to the force of gravity.

Mechanical Linkage: As used in this disclosure, a mechanical linkage is an interconnected arrangement of components that are used to manage the transfer of a movement or a force. A mechanical linkage is often referred to as a linkage.

Monomer: As used in this disclosure, a monomer refers to a molecular structure that bonds to itself in a repeating manner to form a polymer.

Motor: As used in this disclosure, a motor refers to the method of transferring energy from an external power source into rotational mechanical energy.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a movable barrier structure that is in an orientation that allows passage through a port or an aperture. The open position is often referred to as an object being "open."

Organic: As used in this disclosure, organic refers to a carbon-based chemical structure. A limited number of carbon-based salts are traditionally considered inorganic chemical structures and are excluded from the study of organic chemistry.

Orientation: As used in this disclosure, orientation refers to the positioning of a first object relative to: 1) a second object; or, 2) a fixed position, location, or direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedal: As used in this disclosure, a pedal is a foot operated lever that is used by the foot to power mechanical devices.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Plastic: As used in this disclosure, plastic refers to a manufactured material that is formed from a structure selected from the group consisting of a polymer or a copolymer. Unless stated otherwise, this disclosure assumes that the plastic is formed from organic monomers.

Polymer: As used in this disclosure, a polymer refers to a molecular chain that comprises multiple repeating units known as monomers. The repeating unit may be an atom or a molecular structure.

Port: As used in this disclosure, a port is an aperture formed in an object that allows fluid to flow through the boundary of the object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains an environment suitable within the protected space that is appropriate for the object; or, c) protects the object within the protected space from potential dangers that are outside of the protected space.

Protection Space: As used in this disclosure, a protection space is a space formed by a boundary structure. The boundary structure forms a protective barrier that protects objects outside the protection space from potential dangers from the operation of a device or process contained within the protection space.

Ring: As used in this disclosure, a ring is term that is used to describe a disk-like structure through which a negative space is formed through the faces of the disk-like structure. Rings are often considered loops.

Rotation: As used in this disclosure, rotation refers to the cyclic movement of an object around a fixed point or fixed axis. The verb of rotation is to rotate.

Segregated Space: As used in this disclosure, a segregated space refers to a first negative space that does not overlap with a second negative space. By overlap is meant that that the first negative space and a second negative space do not share any common spaces. As a practical matter, when two negative spaces are formed such that a fluid will not flow between the two negative spaces, the two negative spaces can be considered segregated.

Semi-Enclosed Prism: As used in this disclosure, a semi-enclosed prism is a prism-shaped structure wherein a portion of the lateral face of the prism-shaped is removed or otherwise replaced with a negative space. Always use negative space.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Therapeutic: As used in this disclosure, therapeutic is an adjective that refers to a medical, ameliorative, or hygienic substance, process, procedure, or device.

Trash Bag: As used in this disclosure, a trash bag is a disposable bag formed from a sheeting that is used to contain trash and other refuse for in a manner suitable for disposal. Trash bags are often used to line a waste container.

Tight Fit: As used in this disclosure, a tight fit refers to the insertion of a first object into a second object such that there is not a lot of space between the first object and the second object. By not a lot of space is meant that friction occurs when the first object moves within the second object.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A feminine hygiene disposal container comprising a housing structure, a control structure, and one or more bag cartridges;

wherein the housing structure contains the control structure and the one or more bag cartridges;

wherein the control structure is an electromechanical device;

wherein the control structure detects the deposit of a feminine hygiene product into the feminine hygiene disposal container;

wherein the control structure secures each deposited feminine hygiene product into a segregated protection space;

wherein by segregated protection space is meant that the protection space that encloses any initially selected feminine hygiene product deposited into the housing structure is segregated from the protection space that encloses any subsequent feminine hygiene product that is deposited into the housing structure;

wherein the control structure further determines the mass of the feminine hygiene products that are contained within the housing structure;

wherein the control structure generates a visible indication that the housing structure is full when the mass of the feminine hygiene products exceeds a previously determined mass.

2. The feminine hygiene disposal container according to claim 1 wherein the feminine hygiene disposal container is a containment structure;

wherein the feminine hygiene disposal container is configured for use with a feminine hygiene product;

wherein the feminine hygiene disposal container forms a protected space that encloses the feminine hygiene product after use;

wherein the feminine hygiene disposal container receives the feminine hygiene product;

wherein the feminine hygiene disposal container secures the feminine hygiene product in the protection space.

3. The feminine hygiene disposal container according to claim 2 wherein the control structure controls the operation of the feminine hygiene disposal container;

wherein by controlling the operation of the feminine hygiene disposal container is meant that the control structure: a) detects the deposit of a feminine hygiene product; and, b) secures the feminine hygiene product in the protection space;

wherein after the deposit of the feminine hygiene product, the control structure draws an individual bag cartridge selected from the one or more bag cartridges into the hollow interior of the housing structure;

wherein the control structure twists the individual bag cartridge around a vertically oriented axis of rotation such that the lateral face of the individual bag cartridge closes in on itself;

wherein the control structure continues the twisting process until the lateral face of the individual bag cartridge forms a fluid impermeable enclosure that forms the segregated protection space that encloses the feminine hygiene product.

4. The feminine hygiene disposal container according to claim 3 wherein each selected individual bag cartridge forms a segregated protection space for each feminine hygiene product deposited into the housing structure;

wherein the segregated protection space formed by the selected individual bag cartridge around each deposited feminine hygiene product forms a fluid impermeable barrier around the deposited feminine hygiene product.

5. The feminine hygiene disposal container according to claim 4 wherein the housing structure forms the containment structure of the feminine hygiene disposal container;

wherein the housing structure is a hollow structure;

wherein the housing structure is a rigid structure;

wherein the housing structure forms the containment space used to hold the feminine hygiene products;

wherein the housing structure contains the control structure and the one or more bag cartridges.

6. The feminine hygiene disposal container according to claim 5 wherein the housing structure comprises a pan structure and a lid structure;

wherein the pan structure is a prism structure;

wherein the pan structure is formed as a semi-enclosed prism structure;

wherein the pan structure has a pan shape;

wherein the pan structure is a hollow structure;

wherein the pan structure forms the physical containment space of the housing structure;

wherein the lid structure is a disk shaped structure;

wherein the lid structure is geometrically similar to the pan structure;

wherein the lid structure attaches to the pan structure such that the lid structure rotates relative to the pan structure;

wherein the lid structure rotates between an open position and a closed position.

7. The feminine hygiene disposal container according to claim 6 wherein the control structure comprises a logic circuit, an electric motor, and a rotating ring;

wherein the logic circuit, the electric motor, and the rotating ring are electrically interconnected.

8. The feminine hygiene disposal container according to claim 7 wherein the logic circuit is an electric circuit;

wherein the logic circuit controls the operation of the control structure;

wherein the electric motor electrically connects to the logic circuit;

wherein the logic circuit controls the operation of the electric motor;

wherein the logic circuit monitors the weight of the feminine hygiene products contained in the pan structure of the housing structure;

wherein the logic circuit generates a visible indication that the pan structure is full when the mass of the feminine hygiene products exceeds the previously determined mass;

wherein the logic circuit monitors the position of the lid structure;

wherein the logic circuit initiates the twisting of the individual bag cartridge when the detects a change in status of the lid structure from the open position into the closed position.

9. The feminine hygiene disposal container according to claim 8 wherein the electric motor is an electrical device;

wherein the electric motor converts electric energy into rotational energy;

wherein the logic circuit provides the electric motor with the electric energy necessary for operation;

wherein the electric motor forms a mechanical linkage with the rotating ring such that the rotation of the electric motor rotates the rotating ring;

wherein the electric motor comprises an EM gear;

wherein the EM gear is a gear;

wherein the EM gear mounts on the electric motor such that the rotation of the electric motor rotates the EM gear;

wherein the rotating ring is a ring shaped structure;

wherein the inner perimeter of the rotating ring forms a physical connection with the lateral face of the individual bag cartridge.

10. The feminine hygiene disposal container according to claim 9 wherein the rotating ring comprises a RR gear structure;

wherein the RR gear structure is a gear;

wherein the teeth of the RR gear structure mount on the outer perimeter of the disk structure of the rotating ring;

wherein the teeth of the EM gear mesh with the teeth of the RR gear structure such that the rotation of the EM gear rotates the RR gear structure;

wherein the rotation of the RR gear structure subsequently rotates the rotating ring;

wherein the outer perimeter of the rotating ring forms a physical connection with the EM gear of the electric motor;

wherein the rotation of the EM gear rotates the rotating ring;

wherein the rotation of the rotating ring rotates the lateral face of the individual bag cartridge such that the rotating ring rotates the lateral face of the individual bag cartridge onto itself to form the fluid impermeable closure that creates the segregated protection space that encloses the feminine hygiene product.

11. The feminine hygiene disposal container according to claim 10 wherein the logic circuit further comprises a lid sensor, a weight sensor, and an indication LED;

wherein the lid sensor is an electric structure;

wherein the lid sensor mounts on the pan structure;

wherein the lid sensor electrically connects to the logic circuit;

wherein the logic circuit monitors the lid sensor;

wherein the logic circuit uses the lid sensor to determine when the lid structure has rotated into the closed position;

wherein the weight sensor is an electric structure;

wherein the weight sensor mounts in the hollow interior of the pan structure;

wherein the weight sensor electrically connects to the logic circuit;

wherein the logic circuit monitors the weight sensor;

wherein the logic circuit uses the weight sensor to determine when the weight of the feminine hygiene products contained in the pan structure exceeds the predetermined weight threshold;

wherein the indication LED is an LED;

wherein the indication LED mounts on the exterior surface of the pan structure;

wherein the indication LED electrically connects to the logic circuit;

wherein the logic circuit monitors the indication LED;

wherein the logic circuit illuminates the indication LED when the weight of the feminine hygiene products contained in the pan structure exceeds the predetermined weight threshold.

12. The feminine hygiene disposal container according to claim 11 wherein the lid structure attaches to the pan structure such that the lid structure encloses the open face of the pan structure when the lid structure is in the closed position;

wherein the lid structure forms a fluid impermeable seal with the open face when the lid structure is in the closed position;

wherein the control structure monitors the position of the lid structure.

* * * * *